US012688153B1

(12) United States Patent
Yu

(10) Patent No.: US 12,688,153 B1
(45) Date of Patent: Jul. 21, 2026

(54) METHODS AND APPARATUS FOR ENCRYPTED INDEXING AND SEARCHING ENCRYPTED DATA

(71) Applicant: SIMBA Chain, Inc., Plymouth, IN (US)

(72) Inventor: Edward Liang Yu, Millbrae, CA (US)

(73) Assignee: SIMBA Chain, Inc., Plymouth, IN (US)

( * ) Notice: Subject to any disclaimer, the term of this patent is extended or adjusted under 35 U.S.C. 154(b) by 0 days.

(21) Appl. No.: 18/741,197

(22) Filed: Jun. 12, 2024

Related U.S. Application Data

(60) Division of application No. 17/843,628, filed on Jun. 17, 2022, now Pat. No. 12,045,361, which is a continuation of application No. 16/901,623, filed on Jun. 15, 2020, now Pat. No. 11,366,918, which is a continuation of application No. 15/912,079, filed on Mar. 5, 2018, now Pat. No. 10,685,132, which is a
(Continued)

(51) Int. Cl.
| | |
|---|---|
| *G06F 16/13* | (2019.01) |
| *G06F 16/22* | (2019.01) |
| *G06F 16/245* | (2019.01) |
| *G06F 21/62* | (2013.01) |
| *H04L 9/06* | (2006.01) |

(52) U.S. Cl.
CPC ........ *G06F 16/137* (2019.01); *G06F 16/2228* (2019.01); *G06F 16/245* (2019.01); *G06F 21/6218* (2013.01); *H04L 9/0643* (2013.01)

(58) Field of Classification Search
CPC ... G06F 16/137; G06F 16/245; G06F 16/2228
See application file for complete search history.

(56) References Cited

U.S. PATENT DOCUMENTS

| | | | | |
|---|---|---|---|---|
| 9,256,644 | B1 * | 2/2016 | Spellward | G06F 16/334 |
| 9,268,806 | B1 * | 2/2016 | Kesselman | G06F 16/22 |
| 9,325,791 | B1 | 4/2016 | Blahaerath et al. | |

(Continued)

FOREIGN PATENT DOCUMENTS

WO     WO-2017/044595 A1     3/2017

OTHER PUBLICATIONS

Final Office Action mailed on Sep. 28, 2018, for U.S. Appl. No. 15/259,863, filed Sep. 8, 2016, 20 pages.

(Continued)

*Primary Examiner* — Tarek Chbouki

(74) *Attorney, Agent, or Firm* — COOLEY LLP

(57) ABSTRACT

In some embodiments, an apparatus includes a memory and a processor. The processor is configured to receive an index file that associates a characteristic in a set of documents with a set of information associated with the characteristic in the set of documents. The processor is further configured to generate an index identifier associated with the index file and calculate a set of pseudorandom logical block identifiers associated with a set of storage locations of a database based on the index identifier. The processor is then configured to parse the index file into a set of index data portions and send a signal to the database to write each index data portion from the set of index data portions at a different storage location within the database as indicated by a different identifier from the set of pseudorandom logical block identifiers.

20 Claims, 5 Drawing Sheets

Related U.S. Application Data division of application No. 15/425,463, filed on Feb. 6, 2017, now Pat. No. 9,910,999.

(56) References Cited

U.S. PATENT DOCUMENTS

| | | | |
|---|---|---|---|
| 9,342,705 B1 | 5/2016 | Schneider et al. | |
| 9,390,116 B1* | 7/2016 | Li | G06F 16/2272 |
| 9,405,926 B2 | 8/2016 | Lewis | |
| 9,418,072 B2* | 8/2016 | Calkowski | H04L 67/1095 |
| 9,910,999 B1 | 3/2018 | Yu | |
| 10,275,611 B1 | 4/2019 | Yu | |
| 10,402,109 B2 | 9/2019 | Yu | |
| 10,685,132 B1 | 6/2020 | Yu | |
| 10,983,867 B1* | 4/2021 | Zhang | G06F 11/1448 |
| 11,366,918 B1 | 6/2022 | Yu | |
| 12,045,361 B1 | 7/2024 | Yu | |
| 2004/0044659 A1 | 3/2004 | Judd et al. | |
| 2008/0117991 A1 | 5/2008 | Peddireddy et al. | |
| 2008/0229037 A1* | 9/2008 | Bunte | G06F 21/6218 |
| | | | 711/E12.103 |
| 2010/0145970 A1 | 6/2010 | Gorti et al. | |
| 2012/0330908 A1 | 12/2012 | Stowe et al. | |
| 2013/0073870 A1 | 3/2013 | Sauerwald et al. | |
| 2013/0166855 A1* | 6/2013 | Batwara | G06F 12/0802 |
| | | | 711/154 |
| 2015/0082399 A1 | 3/2015 | Wu et al. | |
| 2015/0143112 A1 | 5/2015 | Yavuz et al. | |
| 2015/0169570 A1* | 6/2015 | Shim | G06F 16/2255 |
| | | | 707/747 |
| 2015/0379292 A1 | 12/2015 | Lewis | |
| 2016/0085790 A1 | 3/2016 | Gukal | |
| 2016/0283472 A1* | 9/2016 | Yamaoka | G06F 40/194 |
| 2016/0299924 A1 | 10/2016 | Fujimoto et al. | |
| 2016/0306560 A1* | 10/2016 | Maranna | G06F 16/1748 |
| 2017/0026173 A1* | 1/2017 | Masek | G06F 16/2228 |
| 2017/0068477 A1 | 3/2017 | Yu | |
| 2017/0193003 A1* | 7/2017 | Vijayan | G06F 3/0647 |
| 2017/0270528 A1* | 9/2017 | Prakash | G06Q 20/3224 |
| 2017/0295236 A1* | 10/2017 | Kulkarni | H04L 67/1097 |
| 2017/0300713 A1* | 10/2017 | Fan | G06F 16/245 |

OTHER PUBLICATIONS

International Search Report and Written Opinion mailed Dec. 9, 2016, for International Application No. PCT/US2016/050731, filed on Sep. 8, 2016, 7 pages.

Non-Final Office Action mailed on Aug. 11, 2017, for U.S. Appl. No. 15/425,463, filed Feb. 6, 2017, 17 pages.

Non-Final Office Action mailed on Mar. 2, 2018, for U.S. Appl. No. 15/259,863, filed Sep. 8, 2016, 13 pages.

Non-Final Office Action mailed on Sep. 11, 2019, for U.S. Appl. No. 15/912,079, filed Mar. 5, 2018, 13 pages.

Non-Final Office Action mailed on Oct. 10, 2023, for U.S. Appl. No. 17/843,628, filed Jun. 17, 2022, 7 pages.

* cited by examiner

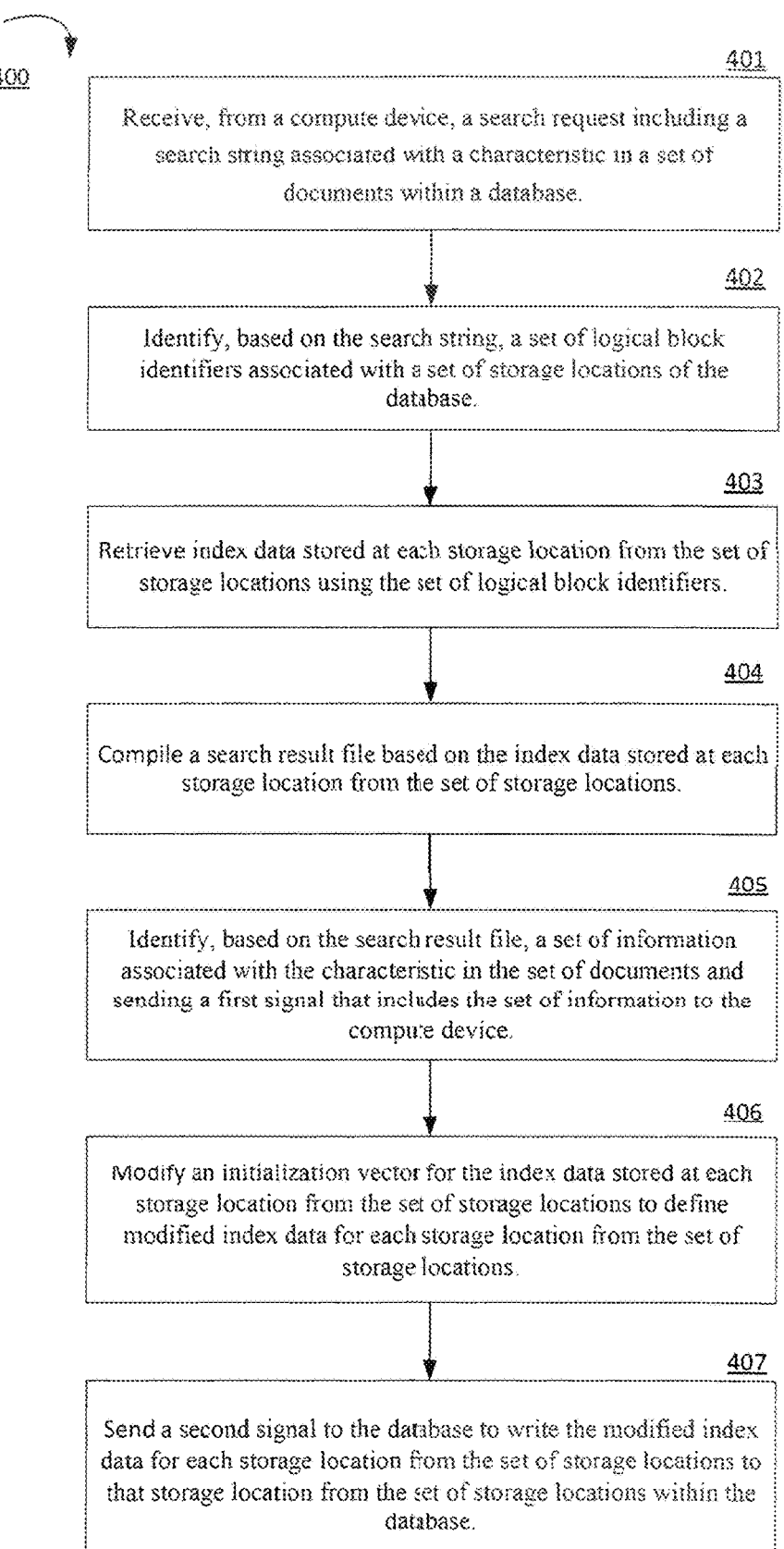

400

401

Receive, from a compute device, a search request including a search string associated with a characteristic in a set of documents within a database.

402

Identify, based on the search string, a set of logical block identifiers associated with a set of storage locations of the database.

403

Retrieve index data stored at each storage location from the set of storage locations using the set of logical block identifiers.

404

Compile a search result file based on the index data stored at each storage location from the set of storage locations.

405

Identify, based on the search result file, a set of information associated with the characteristic in the set of documents and sending a first signal that includes the set of information to the compute device.

406

Modify an initialization vector for the index data stored at each storage location from the set of storage locations to define modified index data for each storage location from the set of storage locations.

407

Send a second signal to the database to write the modified index data for each storage location from the set of storage locations to that storage location from the set of storage locations within the database.

FIG. 4

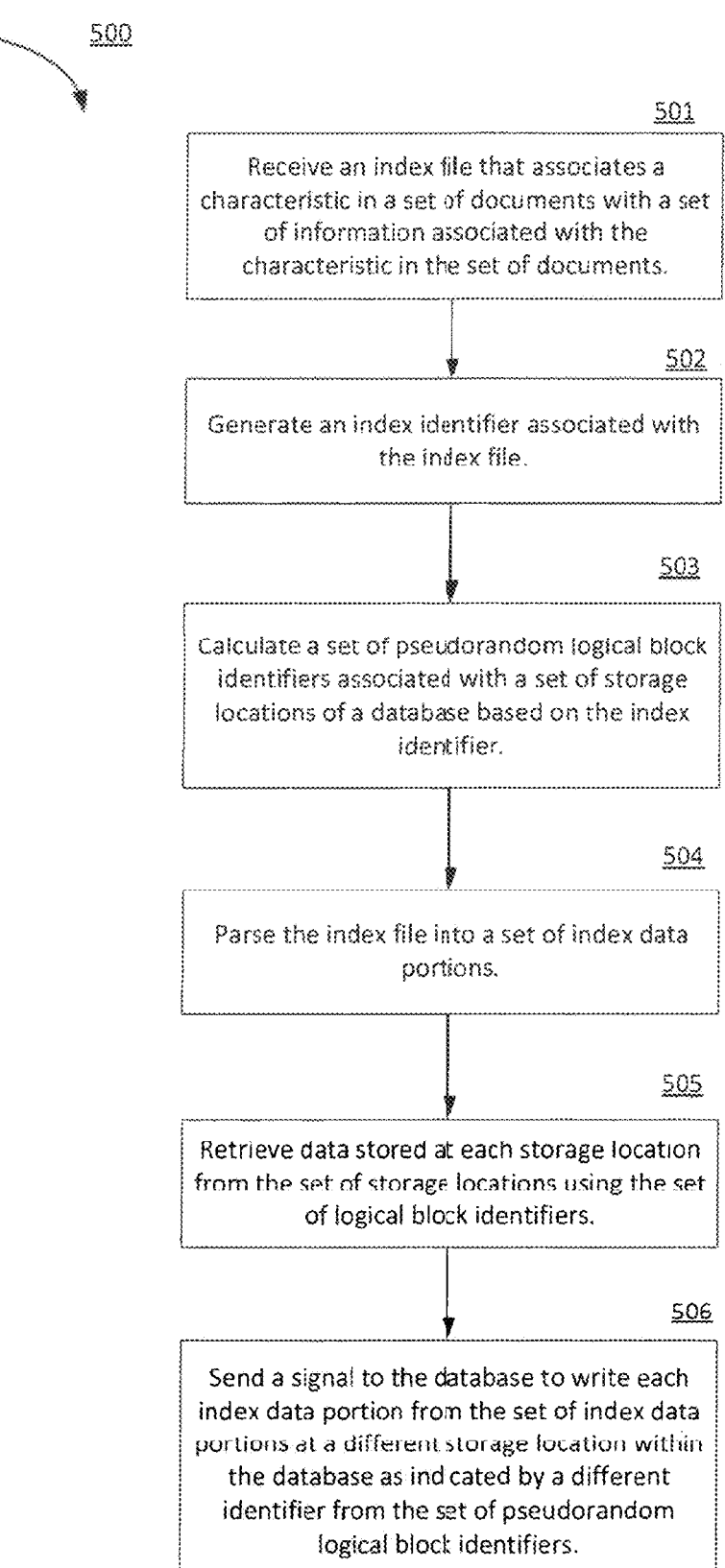

500

501

Receive an index file that associates a characteristic in a set of documents with a set of information associated with the characteristic in the set of documents.

502

Generate an index identifier associated with the index file.

503

Calculate a set of pseudorandom logical block identifiers associated with a set of storage locations of a database based on the index identifier.

504

Parse the index file into a set of index data portions.

505

Retrieve data stored at each storage location from the set of storage locations using the set of logical block identifiers.

506

Send a signal to the database to write each index data portion from the set of index data portions at a different storage location within the database as indicated by a different identifier from the set of pseudorandom logical block identifiers.

FIG. 5

METHODS AND APPARATUS FOR ENCRYPTED INDEXING AND SEARCHING ENCRYPTED DATA

CROSS-REFERENCE TO RELATED APPLICATIONS

This application is a divisional of U.S. patent application Ser. No. 17/843,628, filed Jun. 17, 2022, entitled "Methods and Apparatus for Encrypted Indexing and Searching Encrypted Data" (now U.S. Pat. No. 12,045,361), which is a continuation of U.S. patent application Ser. No. 16/901,623, filed Jun. 15, 2020, entitled "Methods and Apparatus for Encrypted Indexing and Searching Encrypted Data" (now U.S. Pat. No. 11,366,918), which is a continuation of U.S. patent application Ser. No. 15/912,079, filed Mar. 5, 2018, entitled "Methods and Apparatus for Encrypted Indexing and Searching Encrypted Data" (now U.S. Pat. No. 10,685,132), which is a divisional of U.S. patent application Ser. No. 15/425,463, filed Feb. 6, 2017, entitled "Methods and Apparatus for Encrypted Indexing and Searching Encrypted Data" (now U.S. Pat. No. 9,910,999), each of which is incorporated herein by reference in its entirety.

This application is related to U.S. patent application Ser. No. 15/259,863, filed on Sep. 8, 2016 and entitled "Systems and Methods for Storing Data Blocks Using A Set of Generated Logical Memory Identifiers" (now U.S. Pat. No. 10,402,109), which is incorporated herein by reference in its entity.

BACKGROUND

Some embodiments described herein relate generally to methods and apparatus for indexing and searching encrypted data and/or documents. In particular, but not by way of limitation, some embodiments described herein relate to methods and apparatus for storing encrypted index files using a set of generated logical memory identifiers and searching in the encrypted index files.

Enterprises often encrypt their electronic files containing sensitive data for security and privacy concerns. Searching among a number of encrypted documents based on content within the encrypted documents can be challenging. Known solutions include defining an association between a search string (e.g., a keyword) and a set of encrypted file identifiers that identifies a set of encrypted files. Instead of searching based on the search string, these solutions involve searching based on the set of encrypted file identifiers. These solutions, however, still present a security problem because the association between the search string and the set of encrypted file identifiers is not encrypted and is open to security attacks.

Accordingly, a need exists for improved and secure methods and apparatus for indexing and searching encrypted documents.

SUMMARY

In some embodiments, an apparatus includes a memory and a processor operatively coupled to the memory. The processor is configured to receive an index file that associates a characteristic in a set of documents with a set of information associated with the characteristic in the set of documents. The set of information includes a document identifier (1) from a set of document identifiers and (2) for each document from the set of documents. The processor is further configured to generate an index identifier associated with the index file and calculate a set of pseudorandom logical block identifiers associated with a set of storage locations of a database based on the index identifier. The processor is configured to parse the index file into a set of index data portions and send a signal to the database to write each index data portion from the set of index data portions at a different storage location within the database as indicated by a different identifier from the set of pseudorandom logical block identifiers.

In some embodiments, a method includes receiving, from a compute device, a search request including a search string associated with a characteristic in a set of documents within a database. The method also includes identifying, based on the search string, a set of logical block identifiers associated with a set of storage locations of the database and retrieving index data stored at each storage location from the set of storage locations using the set of logical block identifiers. The method includes compiling a search result file based on the index data stored at each storage location from the set of storage locations and identifying, based on the search result file, a set of information associated with the characteristic in the set of documents. The method includes sending a first signal that includes the set of information to the compute device. The method also includes modifying an initialization vector for the index data stored at each storage location from the set of storage locations to define modified index data for each storage location from the set of storage locations. Moreover, the method includes sending a second signal to the database to write the modified index data for each storage location from the set of storage locations to that storage location from the set of storage locations within the database.

BRIEF DESCRIPTION OF THE DRAWINGS

FIG. 4 is a flowchart illustrating an index searching process, according to an embodiment.

FIG. 5 is a flowchart illustrating an index file upload process in the case of a read operation, according to an embodiment.

DETAILED DESCRIPTION

Figure 1:
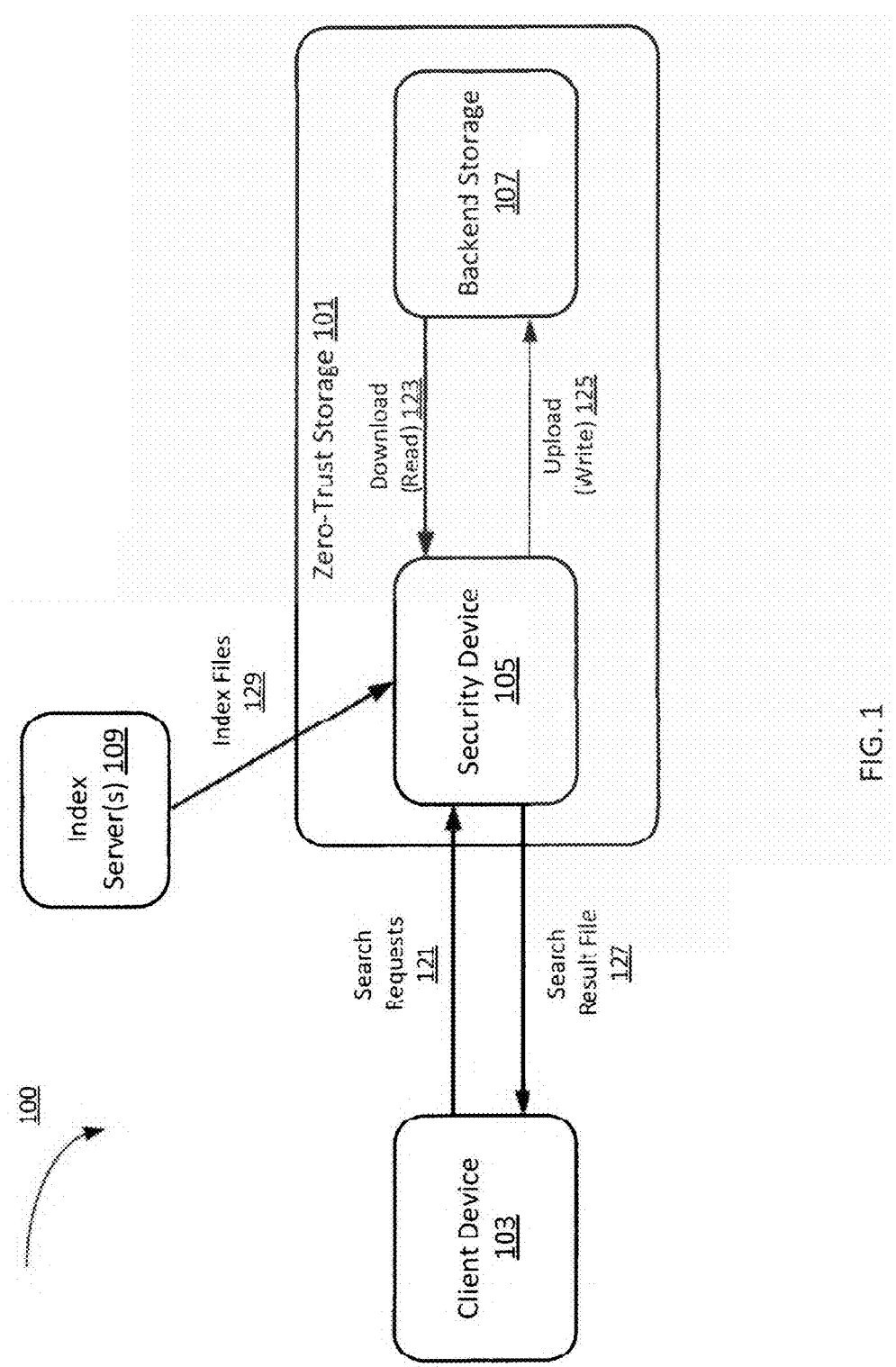
FIG. 1 is a schematic block diagram of an index searching system, according to an embodiment.

In some embodiments, an apparatus includes a memory and a processor operatively coupled to the memory. The processor is configured to receive an index file that associates a characteristic in a set of documents with a set of information associated with the characteristic in the set of documents. The set of information includes a document identifier (1) from a set of document identifiers and (2) for each document from the set of documents. The processor is further configured to generate an index identifier associated with the index file and calculate a set of pseudorandom logical block identifiers associated with a set of storage locations of a database based on the index identifier. The processor is then configured to parse the index file into a set of index data portions and send a signal to the database to write each index data portion from the set of index data portions at a different storage location within the database as indicated by a different identifier from the set of pseudorandom logical block identifiers.

In some embodiments, a method includes receiving, from a compute device, a search request including a search string associated with a characteristic in a set of documents within a database. The method also includes identifying, based on the search string, a set of logical block identifiers associated with a set of storage locations of the database and retrieving index data stored at each storage location from the set of storage locations using the set of logical block identifiers. The method includes compiling a search result file based on the index data stored at each storage location from the set of storage locations and identifying, based on the search result file, a set of information associated with the characteristic in the set of documents. The method includes sending a first signal that includes the set of information to the compute device. The method also includes modifying an initialization vector for the index data stored at each storage location from the set of storage locations to define modified index data for each storage location from the set of storage locations. Moreover, the method includes sending a second signal to the database to write the modified index data for each storage location from the set of storage locations to that storage location from the set of storage locations within the database.

In some embodiments, an index searching system, for example, can be configured to store data (e.g., index files) and hide the operations of the storing and the target of the memory location where the data is stored. In some implementations, for example, an index searching system is a storage system configured to store data without storing and/or maintaining, for example, the data's meta-data, content of the data, a key used to encrypt the data, a storage location of the data within the storage system, a storage operation associated with storing the data, and/or the like.

In some embodiments, an index searching system, for example, can be configured to retrieve, based on a search string, a set of locations in a memory where index data are stored and compile a search result file from the index data. The index searching system can then be configured to retrieve document information (e.g., document identifiers) associated with the search string from the search result file and send such document information to a client device.

In some embodiments, an "index file" can be, for example, a computer file or collection of data with an index that allows retrieval of relevant information or documents based on a search query. The index file can be generated (e.g., by an index server or other compute device) by parsing components (e.g., words, letters, or meta-data) of a set of documents or other form of media and inserting the parsed components into forward or inverted indices. Such document parsing (similar to search engine indexing) can involve natural language processing. The terms "indexing", "parsing", and "tokenization" are used interchangeably herein.

For example, an index file can include a set of index entries. Each index entry from the set of index entries defines an association of a characteristic (e.g., a word, a letter, a phrase, or meta-data) in a set of documents with a set of information associated with the characteristic in the set of documents. The set of information can include, for example, a document identifier from a set of document identifiers for each document from the set of documents, a set of locations of the characteristic in the set of documents, a set of statistical information associated with the characteristic in the set of documents (e.g., the number of times the characteristic appears in the set of documents, the portions of the documents typically including the characteristic, etc.), a relationship information associated with a relationship between a first characteristic in the set of documents and a second characteristic in the set of documents (e.g., the proximity of and/or distance between two words in the documents from the set of documents, the portions of the document including the first characteristic and/or the second characteristic, the type of documents containing the first characteristic and/or the second characteristic, etc.), and/or the like.

For example, the index file can include an index entry defining an association of phrase "San Francisco" with (1) the document identifier of each document that has the phrase "San Francisco", (2) the location in the storage (e.g., back-end storage 107 of FIG. 1) of each document that has the phrase, (3) the location of the phrase in each document (e.g., page 2, paragraph 3, line 4), (4) how many times the phrase appears in each document, (5) the other words that are in the same sentence of the phrase in each document, (6) the document identifier of each document that has the phrase "San Francisco" and the phrase "software engineer," and/or the like.

The index file can be updated and/or redefined. Additional characteristics and the associations of such characteristics with a set of information can be added to the index file. For example, an index file can include two separate index entries. The first index entry in this example describes an association of phrase "San Francisco" with a first set of information in the set of documents (e.g., the document identifier of each document that has the phrase "San Francisco"). The second index entry describes an association of phrase "software engineer" with a second set of information in the set of documents (e.g., the document identifier of each document that has the phrase "software engineer"). A new index entry can be added to the index file that describes an association of phrase "San Francisco" and phrase "software engineer" with a third set of information in the set of documents (e.g., the document identifier of each document that has both the phrase "San Francisco" and the phrase "software engineer"). In some instances, these new index entries can be added to the index file based on how often these phrases are queried. For example, when the phrase "San Francisco" and the phrase "software engineer" are frequently queried together, the new index entry can be added to the index file such that when a client device provides the combined query, a security device can determine storage locations for the combined index entry (rather than for the two separate index entries). This can reduce the complexity of frequent searches.

The term "meta-data" refers to information of the data that is not contained in the content of the data but nevertheless can be kept and/or identified by a storage system. For example, for a file document, the meta-data can include the file name, file size, file type, file location, file author, and/or the like.

The term "document" can refer to, for example, a document, a data structure and/or a file stored in a storage system. A document can be, for example, an index file, a data file, a video, an image, a webpage, a message such as email or a chat message, a record in a database system, and/or the like.

The term "storage operations" can refer to, for example, operations or actions supported by a storage system. Typical operations can include, for example, read, write, update, append, delete, search, query, index, and/or the like.

The term "storage" refers to any suitable storage system such as, for example, a physical storage system or a cloud-based storage system. A storage includes a memory that allows storage of document(s) that can be subsequently retrieved.

The term "storage unit" refers to a unit of operation used by a storage system. For instance, for a file system (e.g., Microsoft® Windows New Technology File System (NTFS)), the storage unit can be a file; for a database system (e.g., MySQL® database), the storage unit can be a record or a row; for an object store (e.g., Amazon™ S3), the storage unit can be an object; and for a block-based storage array (e.g., DataDirect™ Networks), the storage unit can be a block. For a zero-trust storage, internally the storage unit can be a logical block.

The term "pseudorandom number generator" or the term "randomizer module" refers to a module configured to generate a sequence of numbers whose properties approximate the properties of a sequence of random numbers. The generated sequence can be pseudorandom because given the same seed the same sequence can be reproduced. In some instances, the pseudorandom number generator can take as inputs, for example, a seed, a range, and/or a cryptographic key. The range can determine (or define) a range of output numbers generated by the pseudorandom number generator. The seed is described in further detail below. In some implementations, the cryptographic key can be predetermined and hidden from any device and/or module accessing and/or interacting with the pseudorandom number generator. In other instances, the device and/or module accessing the pseudorandom number generator can supply a cryptographic key to the pseudorandom number generator to customize the process used to generate the sequence of numbers so that given the same seed and same range, the sequence of numbers can be different if different cryptographic keys are provided. Similarly, for the same pseudorandom number generator and thus the same process, if the same cryptographic key, seed, and range are provided, the same sequence can be generated.

The term "seed" can be a set of initial values (or a single value) that is provided to a pseudorandom number generator to generate a sequence of pseudorandom numbers. In some implementations, given the same seed to the same pseudorandom number generator, the sequence of numbers generated can be the same.

The term "encryption" refers to any cryptographic method to encode a document so that only authorized parties can read/access the encoded document. The term "decryption" refers to any cryptographic method to decode a document so that the encoded document can be decoded and read (or accessed) by authorized parties, devices, modules, and/or components.

The term "initialization vector" refers to any numerical or non-numerical value. For example, in some instances, an initialization vector can be a nonce (number used once) or an alphanumeric sequence. In some implementations, the initialization vector can be an input similar to a key used with the encryption process. In some implementations, not all encryption mechanisms use an initialization vector. The property of the initialization vector can depend on the encryption process. For example, for some encryption processes the initialization vector can be random or pseudorandom. For another example, in other encryption processes the initialization vector is non-repeating. For some encryption schemes, however, the initialization vector can be made public even if it is random or non-repeating.

As used herein, a module can be, for example, any assembly and/or set of operatively-coupled electrical components, and can include, for example, hardware like a memory, a processor, software (executing in hardware), and/or the like. As used herein, the singular forms "a," "an" and "the" include plural referents unless the context clearly dictates otherwise. Thus, for example, the term "a zero-trust storage" is intended to mean a single zero-trust storage or multiple zero-trust storages with similar functionalities. For another example, the term "a data file" is intended to mean a single data file or multiple data files. Additional details regarding zero-trust storage can be found in U.S. patent application Ser. No. 15/259,863, which has been incorporated herein by reference in its entirety.

FIG. 1 is a schematic block diagram of an index searching system 100, according to an embodiment. In some embodiments, the index searching system 100 includes a client device(s) 103, an index server(s) 109, and a zero-trust storage 101. The zero-trust storage 101 can be operatively coupled to the client device 103 and the index server 109. The zero-trust storage 101 includes a security device 105 and a backend storage 107 operatively coupled to the security device 105.

In some embodiments, the security device 105, the backend storage 107, the index server(s) 109, and the client device 103 are stored and/or executed on separate compute devices communicatively coupled together via a network (e.g., the Internet) (not shown). Such compute devices can include processors (e.g., to execute modules, to use application program interfaces (APIs), and/or the like) and/or memories (e.g., to store data and/or instructions for execution by the processors). In other embodiments, the security device 105, the backend storage 107, the index server(s) 109, and the client device 103 can be stored and/or executed on a common compute device.

The client device 103 can be a compute device (or multiple compute devices) having a processor and a memory. For example, the client device 103 can be or include a computer, a cell phone, a tablet, an electronic device, a critical embedded system, coprocessors, and field-programmable gate arrays (FPGAs), a document management system, a file system, another storage system, or any system that uses a storage system to store data for its operation(s). The client device 103 can send search requests 121 including search queries (having, for example, strings, commands, keywords, texts, numbers) to the zero-trust storage 101 and receive search results 127 associated with the search queries and a set of documents from the zero-trust storage 101. In some implementations, the client device 103 can support a set or a subset of operations similar to read, write, update, append, and delete. In some instances, the client device 103 can communicate with the security device 105 via a network (e.g., the Internet, an intranet, a local area network (LAN), a virtual private network (VPN), a wireless LAN (WLAN), a wired network, a wireless network and/or the like). In some implementations, the client device 103 can be a cloud storage system.

The index server(s) 109 can be a compute device (or multiple compute devices) having processing capabilities. For example, in some instances, the index server(s) 109 can be a server such as, for example, a web server, an application server, a proxy server, a telnet server, a file transfer protocol (FTP) server, a mail server, a list server, a collaboration server and/or the like. In other instances, the index server(s) 109 can be a personal computing device such as a desktop computer, a laptop computer, a personal digital assistant (PDA), a standard mobile telephone, a tablet personal computer (PC), and/or so forth. In some implementations, the index server(s) 109 can send a set of index files 129 to zero-trust storage 101 for encryption and storage. In some implementations, the zero-trust storage 101 can retrieve a set of index files 129 from the index server(s) 109. In some implementations, the index server 109 can be a third-party server external to the zero-trust storage 101 and the client device 103. In some implementations, the index server 109 is a component of the zero-trust storage 101 and the zero-trust storage 101 can be configured to generate a set of index files based on a set of documents stored at index server 109 and/or backend storage 107. In some implementations, the index server 109 is a component of the client device 103 and the client device 103 can be configured to generate a set of index files based on a set of documents stored at index server 109 and/or backend storage 107.

The backend storage 107 can be configured to store documents and/or other forms of data. The backend storage 107 can be, for example, a device(s) to implement a cloud storage service such as, for example, Amazon Web Services (AWS)™, Microsoft Azure™, or a physical storage array, or can be an in-memory database, file system, or a data structure. An example of a file that can be securely stored in the backend storage 107 using the security device 105 includes an encrypted search index (e.g., a secure index of encrypted data that can be used to search the encrypted data) of one or more encrypted documents (stored in the backend storage 107 and/or other storage locations). For other examples, any other suitable file and/or data can be stored in the backend storage 107. In some implementations, the backend storage 107 can support two operations equivalent to download 123 and upload 125 (such as receive/send or read/write). The security device 105 can translate the upload and download operations to the operations supported by the backend storage 107. The backend storage 107 can use an internal unit of storage. Some common terms used by the backend storage 107 for each of the units can be, for example, a bucket, an object, a slot, a record, a blob, a box, and/or a file.

The security device 105 can include a processor and a memory and can be an interface between the backend storage 107 and the client device 103. The security device 105 can include hardware modules and/or software modules (e.g., stored in memory and/or executed by a processor). The security device 105 can include any combination of hardware-based modules (e.g., a field-programmable gate array (FPGA), an application specific integrated circuit (ASIC), a digital signal processor (DSP)) and/or software-based modules (a module of computer code stored in memory and/or executed at the processor) capable of performing one or more specific functions associated with that module. In some embodiments, the security device 105 can be a compute device, a server, a host device, and/or the like. Details of the security device 105 are discussed herein with regards to FIG. 2.

The security device 105 includes a storage interface such as a block storage interface, an object store interface, a remote file system, a mountable file system interface and/or the like. In some instances, the client device 103 does not receive and/or store identifiers associated with the location at which the data is stored in the zero-trust storage 101 but can refer to the documents using the identifier to which the client device 103 is accustomed (e.g., using an identifier specific to the client device 103). For example, the client device 103 can use a file-system interface such as files and directory to refer to each document using a path of the document. The client device 103 can also refer to the documents using some kind of document identifier (e.g., using an identifier specific to the client device 103) as if using an object store. The client device 103 can thus call the security device 105 with the typical file operation such as reading a file or writing a file. The client device 103 can also send a search request 121 to the security device 105 when searching for documents, as described in further detail herein. In some instances and as described in further detail herein, the security device 105 can be configured to translate some client device operations into a download request 123 and/or an upload request 125.

In some instances, the zero-trust storage 101 can interact with users through the client device 103. In some instances, the client device 103 can, for example, interact with the zero-trust storage 101 using typical storage operations (or a subset of) such as read, write, update, append, and delete. The security device 105 can translate the client device storage units to the backend storage units and the operations to a set of download and upload operations to be executed by the backend storage 107. In some embodiments, the backend storage 107 can be separate from (or not part of) the zero-trust storage 101 because zero-trust storage 101 can use any suitable backend storage technology. From the perspective of the client device 103, the backend storage 107 is part of the zero-trust storage 101 because the security device 105 overlays and transforms the backend storage 107 into a zero-trust storage 101.

In some implementations, multiple client devices 103 can be operatively coupled to the security device 105. Thus, data from these multiple client devices can be stored to the same backend storage 107 via the security device 105. In some implementations, multiple security devices 105 and/or multiple backend storages 107 can be operatively coupled to the client device 103. Data from the client device 103 can be stored to the multiple backend storages via the multiple security devices 105.

In use, the security device 105 can receive a set of index files 129 from the index server 109 or from the client device 103. In other implementations, the security device 105 can receive a set of documents from the index server 109 or from the client device 103 and parse the set of documents to generate a set of index files based on the set of documents. The security device 105 can generate an index identifier for each index file from the set of index files.

In some implementations, the security device 105 can generate a seed based at least in part on the index identifier for an index file and calculate a set of pseudorandom logical block identifiers based on the seed. The set of pseudorandom logical block identifiers is associated with a set of storage locations of a database (for example, in the backend storage 107). In some implementations, the security device 105 can calculate a set of pseudorandom logical block identifiers directly based on the index identifier without generating a seed. In some implementations, the security device 105 can generate a seed, based at least in part on the index identifier, using a cryptographic pseudorandom hash function with the index identifier as an input to the cryptographic pseudorandom hash function. In some implementations, the security device 105 can use a cryptographic key (e.g., as an input to the cryptographic pseudorandom hash function) in addition to the index identifier to calculate the set of pseudorandom logical block identifiers.

The security device 105 can parse the index file into a set of index data portions and store (or write, or upload) each index data portion from the set of index data portions at a different storage location in the backend storage 107 as indicated by a different identifier from the set of pseudorandom logical block identifiers. In some implementations, the security device 105 can parse the index file by the set of index entries. In such implementations, each index data portion can include one index entry defining an association of a characteristic (e.g., a word, a letter, a phrase, or meta-data) in a set of documents with a set of information (e.g., each document identifier for each document that contains the characteristic) associated with the set of documents. For example, an index file includes two index entries, (1) the first index entry defining an association of phrase "San Francisco" with a first set of document identifiers for a first set of documents that contain phrase "San Francisco", and (2) the second index entry defining an association of phrase "software engineers" with a second set of document identifiers for a second set of documents that contain phrase "software engineers." The security device 105 can parse the index file into two index data portions, the first index data portion including the first index entry and the second index data portion including the second index entry.

In some implementations and as described in further detail herein, each index data portion, which includes one index entry, can be further parsed (e.g., randomly) into a set of secondary index data portions. Each secondary index data portion from the set of secondary index data portions can be stored at a different storage location associated with a pseudorandom logical block identifier.

The security device 105 can store each index data portion by sending a signal to the backend storage 107 or to a database in the backend storage 107. In some implementations, the set of index data portions can be stored at different storage systems, different storage locations within the same storage system (e.g., the backend storage 107), or different databases within the same storage system.

In some implementations, the security device 105 can encrypt each index data portion from the set of index data portions prior to storing each index data portion in the backend storage 107 or prior to sending a signal to the database to store each index data portion in the backend storage 107. In some instances, in response to calculating the set of pseudorandom logical block identifiers and prior to storing each index data portion in the backend storage 107, the security device 105 can retrieve data stored at each storage location within the backend storage 107 indicated by each identifier from the set of pseudorandom logical block identifiers. The advantage of retrieving data stored at each storage location associated with each pseudorandom logical block identifier and then storing each index data portion at each storage location is to hide the operations within the zero-trust storage 101 from other devices (external to zero-trust storage 101) such that the operations are unknown to the other external devices for security and privacy purposes.

In some implementations, prior to storing each index data portion at each storage location in the backend storage 107, the security device 105 can determine that each storage location associated with each pseudorandom logical block identifier does not have existing data stored. For example, the security device 105 can ensure that writing each index data portion at each storage location in the backend storage 107 will not overwrite existing data stored in that storage location. In some instances, for example, the security device 105 can ensure that an identifier stored with data at each storage location indicates that data can be written at that storage location (e.g., upon initialization and/or deletion of data, an identifier can be modified to indicate the storage location is available to be written). In some instances, if such an identifier instead indicates that other data is stored at that location, the security device 105 does not write data to that location and selects another storage location identified by another pseudorandom logical block identifier at which to store data.

An index file can associate a characteristic (e.g., a word, a letter, a phrase, or meta-data) in a set of documents with a set of information associated with the characteristic in the set of documents. The set of information can include, for example, a document identifier (1) from a set of document identifiers and (2) for each document from the set of documents, a set of locations of the characteristic in the set of documents, a set of statistical information associated with the characteristic in the set of documents, a relationship information associated with a relationship between a first characteristic in the set of documents and a second characteristic in the set of documents, and/or the like. For example, the index file can include associations of phrase "San Francisco" with (1) the document identifier of each document that has the phrase "San Francisco", (2) the location in a storage (e.g., backend storage 107) of each document that has the phrase, (3) the location of the phrase in each document (e.g., page 2, paragraph 3, line 4), (4) how many times the phrase appears in each document, (5) the other words that are in the same sentence of the phrase in each document, (6) the document identifier of each document that has the phrase "San Francisco" and the phrase "software engineer," and/or the like.

In use, the security device 105 can receive a search request 121 including a search string from the client device 103. The search string can be associated with a characteristic (e.g., a phrase, a word, a letter, or meta-data) in a set of documents within a database in the backend storage 107. The security device 105 can identify, based on the search string, a set of logical block identifiers associated with a set of storage locations of the database and retrieve index data stored at each storage location from the set of storage locations using the set of logical block identifiers. In some implementations, the set of logical block identifiers is a set of pseudorandom logical block identifiers. In some implementations, the security device 105 can identify a seed based at least in part on the search string, and can calculate the set of pseudorandom logical block identifiers for the database based on the seed, as described above. In other implementations, the security device 105 can identify the set of logical block identifiers using a cryptographic pseudorandom hash function with the seed as an input to the cryptographic pseudorandom hash function. In such implementations, the seed can be at least a portion of the search string.

In some embodiments, the security device 105 (e.g., by the randomizer module 213 in FIG. 2) can determine if the retrieved index data stored at each storage location includes a hash value produced by the document meta-data and/or an identifier associated with the document. Specifically, the security device 105 can determine whether the retrieved index data are part of the requested document by matching one or more identifier(s) stored with the index data (or a hash value produced based on the identifier(s)) and the hash value (or other identifiers). If none of the retrieved index data match the hash value, the document is determined to not be stored in the backend storage 107. If at least one block of index data matches the hash value, any additional blocks of index data can be retrieved (e.g., by the storage module 219 in FIG. 2) using remaining numbers from the sequence of numbers. After the blocks of index data associated with the search request have been retrieved and decrypted, they can be pieced together and/or compiled (e.g., using the sequence of numbers to identify order). The compiled document (i.e., the search result file) can then be returned to the client device 103. In some instances, the search result file can be a portion of the index file originally stored. In some instances, data stored at locations identified by the set of logical block identifiers that does not include the identifier associated with the requested document, can be ignored by security device 105. In other instances, data stored at locations identified by the set of logical block identifiers that does not include the identifier associated with the requested document can still be read and rewritten to the backend storage 107 (e.g., via instructions from security device 105) to obscure from the backend storage 107 which storage locations are associated with the requested document. Such data, however, is not returned to the client device 103.

The security device 105 can then compile a search result file based on the index data stored at each storage location from the set of storage locations and identify, based on the search result file, a set of information associated with the characteristic in the set of documents. The set of information can include a set of document identifiers. Each document identifier from the set of document identifiers is associated with a document from the set of documents associated with the characteristic.

For example, the security device 105 receives a search request 121, which requests to retrieve each document identifier associated with a document that includes phrase "software engineer." In instances when each index entry is stored at a single storage location, the security device 105 can identify, based on the phrase "software engineer", a logical block identifier associated with a storage location (e.g., within the backend storage 107) and retrieve the index entry stored at the storage location. The security device can then send a signal to the client device 103 that includes each document identifier associated with a document that includes the phrase "software engineer" (e.g., as identified by the index entry). In instances when the index entry associated with phrase "software engineer" is parsed into a set of secondary index data portions, the security device 105 can identify, based on the phrase "software engineer", a set of logical block identifiers associated with a set of storage locations of the database and retrieve each secondary index data portion stored at each storage location from the set of storage locations using the set of logical block identifiers. In such instances, the security device 105 can then compile a search result file (e.g., including the index entry or entries) based on the set of secondary index data portions and identify, based on the search result file, each document identifier associated with a document that includes phrase "software engineer."

For another example, the security device 105 receives a search request 121, which requests to retrieve each document identifier associated with a document that includes phrase "San Francisco" and phrase "software engineer." In some instances, the security device 105 can identify, based on phrases "San Francisco" and "software engineer", a set of logical block identifiers associated with a set of storage locations of the database. When a set of logical block identifiers are identified based on the combined search string "San Francisco" and "software engineer"), the security device 105 can retrieve index data (e.g., representing index entries) stored at each storage location from the set of storage locations using the set of logical block identifiers. The index entries based on the index data can include identifiers of documents that include both "San Francisco" and "software engineer".

When a set of logical block identifiers are not identified, the security device 105 can identify, based on phrase "San Francisco", a first set of logical block identifiers associated with a first set of storage locations of the database, and identify, based on phrase "software engineer", a second set of logical block identifiers associated with a second set of storage locations of the database. The security device 105 can retrieve first index data (e.g., representing one or more index entries representing "San Francisco") stored at each storage location from the first set of storage locations and second index data (e.g., representing one or more index entries representing "software engineer") stored at the second set of storage locations. The security device 105 can compare the first index data and the second index data and generate a search result file that includes only overlapping document identifiers (e.g., index entries from both the first index data and the second index data). The overlapping document identifiers are associated with documents that includes both phrase "San Francisco" and phrase "software engineer."

In some implementations, the index data can be stored at different storage systems, different storage locations within the same storage system (e.g., the backend storage 107), or different databases within the same storage system. When the index data are stored at different databases within the same storage system, the set of logical block identifiers is associated with the set of storage locations of the different databases. The security device 105 can send a signal that includes the set of information to the client device 103.

In some implementations, in addition to encrypting index files (or index data portions) associated with a set of documents, the security device 105 (e.g., the encryption module 215 in FIG. 2) can encrypt the set of documents and/or each portion of a set of portions of each document from the set of documents. Once a client device selects a document identifier from the search result file, the security device 105 can retrieve and decrypt each encrypted portion of the document associated with the document identifier. The security device 105 can subsequently compile the document based on the decrypted portions of the document and send the document to the client device 103. The zero-trust storage 101 can be configured to provide secure index search within a set of documents and provide decrypted document.

The security device 105 can modify an initialization vector for the index data stored at each storage location from the set of storage locations to define modified index data for each storage location from the set of storage locations. In some implementations, the security device 105 can encrypt the modified index data for each storage location from the set of storage locations prior to sending a signal to the database to write to the set of storage locations. The security device 105 can send the signal to the database to write the modified index data for each storage location from the set of storage locations to that storage location from the set of storage locations within the database.

Figure 2:
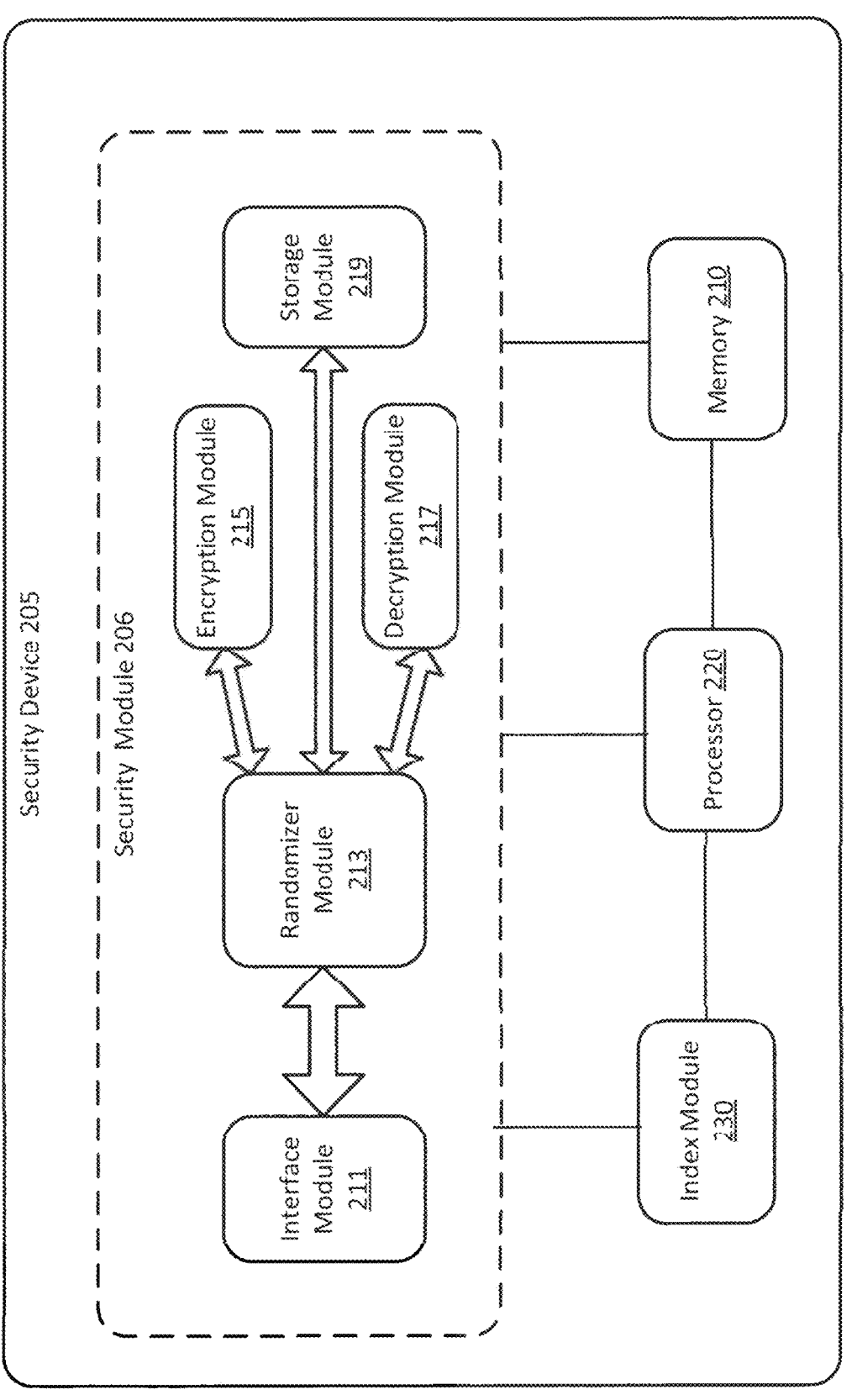
FIG. 2 is a schematic block diagram of a security device within a zero-trust storage, according to an embodiment.

FIG. 2 is a schematic block diagram of a security device 205 within a zero-trust storage, according to an embodiment. The security device 205 within a zero-trust storage (such as the zero-trust storage 101 in FIG. 1) can include a security module 206 (also referred to herein as a security controller), an index module 230 (also referred to herein as an indexer), a processor 220, and a memory 210. The security module 206 can include an interface module 211 (also referred to herein as an interface controller), a randomizer module 213 (also referred to herein as a randomizer), an encryption module 215 (also referred to herein as an encryptor), a decryption module 217 (also referred to herein as an decryptor), and a storage module 219 (also referred to herein as a storage controller). The security device 205 can be structurally and functionally similar to the security device 105 discussed with respect to FIG. 1.

Each operation(s) of the interface module 211, the randomizer module 213, the encryption module 215, the decryption module 217, the storage module 219, the index module 230, as well as the memory 210, can be controlled and/or executed by the processor 220. Each module or component in the security device 205 can be hardware modules and/or software modules (stored in memory 210 and/or executed by a processor 220). Each module or component in the security device 205 can be any combination of hardware-based modules (e.g., a field-programmable gate array (FPGA), an application specific integrated circuit (ASIC), a digital signal processor (DSP)) and/or software-based modules (a module of computer code stored in memory 210 and/or executed at the processor 220) capable of performing one or more specific functions associated with that module. Each module or component in the security device 205 can be operatively coupled to the other modules/components in the security device 205. As discussed herein, the security device 205 and its components can be stored and/or executed on a server, host device, client device, and/or the like. In some embodiments, some components of the security device 205 can be stored and/or executed on a first device (e.g., a server) and other components of the security device 205 can be stored and/or executed on a second device (e.g., a client device) operatively coupled to the first device via a network (e.g., the Internet).

In some instances, the interface module 211 is operatively coupled with a client device (such as the client device 103 in FIG. 1) and the randomizer module 213. The randomizer module 213 is operatively coupled with the storage module 219, the encryption module 215, and the decryption module 217. Because the communication with the storage module 219 can be via encrypted logical blocks of data, the randomizer module 213 can use the encryption module 215 to encrypt logical data blocks before sending the encrypted logical data blocks to the storage module 219. The randomizer module 213 can also use the decryption module 217 to decrypt logical data blocks after receiving the data blocks from the storage module 219.

The interface module 211 is a translation layer of the security device 205 that interfaces with the client device (such as the client device 103 in FIG. 1). Depending on the client device, the interface module 211 can support different client device storage application programming interfaces (APIs). Functionality-wise, the interface module 211 can support search, read, write, update, append, delete requests and/or other suitable instructions. In some cases, the interface module 211 can receive a request (e.g., a search request) from the client device and can then translate the request to a uniform request and/or a request used and recognized by the components of the security module 206. The interface module 211 can also translate an identifier used by the client device (also referred herein to as client identifier) to a storage system identifier used by the rest of the system (e.g., the remaining modules of the security module 206 and/or the backend storage), and a seed used by the randomizer module 213 described in further detail herein. In some instances, the client identifier (e.g., a search string) can be translated and/or used to define a seed using a seed mapping function (e.g., a hash function such as a cryptographic pseudorandom hash function) with the client identifier as an input to the seed mapping function. The seed mapping function can then be used as the translation function. In other instances, any function that translates an identifier to a number (or a set of numbers) deterministically can be used by a seed mapping function. Using a deterministic function for the seed-generating function optimizes and/or improves an accessing pattern of the backend storage. The more random the locations of the actual storage units used by backend storage, the more difficult it can be for the backend storage (or anyone who has access to the backend storage such as a system administrator of the system) to figure out and/or identify the potential locations of the storage units used by the backend storage to store a specific file or datum. Thus, data (e.g., index files) can be privately and randomly stored at the backend storage.

The randomizer module 213 can be configured to translate the uniform access request from the interface module 211 to a sequence of download and upload requests. In some instances, the input from the interface module 211 includes an identifier used by the remaining modules of the security module 206 to refer to the document, the index file, the seed, the operation, and/or the document content in the case of write/append. In some instances, both a download request and an upload request are executed to ensure the backend storage cannot differentiate the operations among read, write, update, append, and delete. Similarly stated, each of the requests look the same to the backend storage system. This prevents leaking an access pattern of zero-trust storage (such as the pattern used by the zero-trust storage 101 in FIG. 1).

The randomizer module 213 can use the seed as an input to a pseudorandom number generator to identify (or generate or calculate) a set of pseudorandom numbers. The randomizer module 213 can then map the set of pseudorandom numbers to a set of logical block numbers (or a set of logical block identifiers) that are used by the storage module 219 to store data at storage locations (e.g., in the backend storage 107 of FIG. 1) associated with the set of logical block numbers. In some implementations, the set of logical block identifiers are not stored in long-term memory (e.g., are not stored in persistent memory at security device 205 or in the backend storage 107 of FIG. 1). Instead, each time the client device accesses specific data or queries based on specific characteristics, the set of logical block identifiers can be identified and/or calculated using the pseudorandom number generator and the seed.

Each logical block identifier can map to the storage unit used by the underlying backend storage as described below. In this implementation, the seed can be used to map to the location of blocks of data (e.g., index files) stored in the backend storage. Similarly stated, the seed can be used as a key to identify where to store the blocks of data (e.g., index files) in the backend storage and similarly which blocks of data (e.g., index files) to retrieve from the backend storage. In other implementations, the seed can be combined with an additional cryptographic key (or other identifier) to generate a sequence of numbers identifying where to store the blocks of data (e.g., index files) in the backend storage in a write operation and, similarly, which blocks of data (e.g., index files) to retrieve from the backend storage in a read operation. Similarly stated, using the seed and the cryptographic key, the sequence generated by the randomizer module 213 can be further randomized. Each number from the sequence of numbers can map to a location in the backend storage storing a portion of the data (e.g., index data portions or index data). The portion of data stored at each memory block of the backend storage pertains to the data file (e.g., index file).

In some implementations, the identifier used by the client device (the client identifier, e.g., a search string) for a query, a specific file and/or access request can be processed by the randomizer module 213 and mapped to a seed mapping function (also referred to herein as a "mapping function"). The seed mapping function can be, for example, a hash function such as a cryptographic pseudorandom hash function. In such an instance, each time the client device requests a query, a specific file or data, the randomizer module 213 can use the seed mapping function (with the identifier used by the client device as an input) to identify, generate and/or calculate the seed. Thus, in such instances, the randomizer module 213 can be configured to calculate the seed each time the client device requests data from the zero-trust storage. In such instances, the randomizer module 213 can use the client identifier (e.g., a search string) for a particular query, a file and/or block of data as an input to the seed mapping function to recalculate and/or recreate the seed each time a request is made with that client identifier. The sequence of numbers (the set of logical block identifiers) generated by the seed can then be used to retrieve the blocks of data (e.g., index data portions) associated with that file and/or data. The set of logical block identifiers is associated with a set of storage locations of a database in the backend storage. In other instances, a mapping between the client identifier and the seed can be used to identify the seed. In still other instances, the client identifier can be the seed used to identify the sequence of numbers (the set of logical block identifiers) used to store and/or retrieve the different blocks of data associated with that file and/or data. In some instances, the client identifier is defined by and is specific to the client device (e.g., a file path used by the client device to store and access the file and/or data).

In some instances, the seed generation can be based on the client identifier (e.g., a search string) or a uniquely identifying property of the data such as a file name, a file path, a record locator, a hash of one or more properties of the data, and/or the like. This allows a user of the system to regenerate the seed from the same client identifier (e.g., a search string) or uniquely identifying property of the data. Given the same seed mapping function, the same pseudorandom number generator process, and the same set of cryptographic keys, the security module 206 can uniquely map to the correct possible set of data blocks used by the backend storage.

The encryption module 215 can be used by the randomizer module 213 to encrypt each data block (e.g., portion of a file, an index data portion) before uploading the data block to the backend storage through the storage module 219. The encryption scheme used by the encryption module 215 can be any suitable encryption scheme. In some implementations, the encryption scheme can be modified and/or pluggable as long as the encryption can be decrypted (e.g., by the decryption module 217) and can scale to the logical block size (e.g., the size of each portion of the file) used by the security module 206. This allows the overall system to swap out "old" encryption schemes that are later found to be either too slow or unsecure and to replace such old encryption schemes with new and improved encryption scheme(s). In some implementations, the encryption module 215 and the decryption module 217 have access to the encryption key, but the interface module 211, the randomizer module 213 and the storage module 219 do not have access to the encryption key. Thus, in some implementations, the encryption module 215 and/or the decryption module 217 can also interact with a key management system (not shown in FIG. 2) and/or a trust platform module (not shown in FIG. 2). In other implementations, the encryption key can be implemented and/or stored by an existing key management system (not shown) either in hardware or software (stored in memory and/or executed in a processor). This makes the architecture extremely flexible and secure because key use is isolated to a small portion of the system and the key is not propagated to other modules of the security module 206 or the backend storage system. In such implementations, this helps to ensure that the backend storage is zero-trust. In still other implementations, the seed generated by the randomizer module 213 can be used as an input to the encryption module 215 and used as an input and/or an encryption key to an encryption function to encrypt the data. In such implementations, for example, the final encryption key can be a function of the stored encryption key and the seed. In such a manner, the final encryption key can be further obscured based on the seed.

The decryption module 217 can be configured to receive and decrypt encrypted data (e.g., encrypted index data portion) stored in the backend storage using a decryption key that can be a compliment to the encryption key. Such a decryption key can be the same as the encryption key, can be stored with the encryption key, can be stored remote from the encryption key, can be paired with the encryption key, and/or the like. In other implementations, the seed can be used by the decryption module 217 as a decryption key and/or as a way to further obscure the decryption key when decrypting the data. In other instances, the same module can act as both the encryption and the decryption modules.

The storage module 219 can be configured to interface with a backend storage. The storage module 219 can handle reading/writing to the underlying storage system using an API or abstraction exposed by the backend storage and mapping the logical block used by the randomizer module 213 to the storage unit used by the backend storage. For example, if AWS S3 is used, the storage module 219 API will be using the S3 API to upload and download encrypted storage unit to the S3 system. The storage module 219 can translate the logical blocks to the S3 storage units such as buckets and/or objects. The storage module 219 can be configured to hide and/or obscure the different interfaces (APIs) of the underlying backend storage so the zero-trust security module 206 can treat the backend storage as a "dumb" storage system with only upload or download operations. This allows the zero-trust storage (such as the zero-trust storage 101 in FIG. 1) to be backend agnostic and pluggable. Accordingly, different backend storage and/or protocols can be used. This also allows the zero-trust storage to secure either a cloud storage system or a physical storage array. In some instances, data passing through the storage module 219 is encrypted by the encryption module 215 prior to being sent to the storage module 219.

The index module 230 can be configured to parse components (e.g., words, letters, phrases, or meta-data) of a set of documents or other form of media and insert into forward or inverted indices to generate a set of index files. Such document parsing (similar to search engine indexing) can involve natural language processing. In some implementations, the security device 205 can receive a set of index files from index servers or from a client device. The index module 230 can generate an index identifier for each index file of the set of index files.

The memory 210 can be, for example, a random-access memory (RAM) (e.g., a dynamic RAM, a static RAM), a flash memory, a removable memory, a hard drive, a database and/or so forth. In some implementations, the memory 210 can include (or store), for example, a database, process, application, virtual machine, and/or other software modules (stored and/or executing in hardware) and/or hardware modules configured to execute an index searching process and/or one or more associated methods for the zero-trust storage. In such implementations, instructions for executing the index searching process and/or the associated methods can be stored within the memory 210 and executed at the processor 220.

The processor 220 can be configured to, for example, write data into and read data from the memory 210, and execute the instructions stored within the memory 210. The processor 220 can also be configured to execute and/or control, for example, the operations of the security module 206, including the interface module 211, the randomizer module 213, the encryption module 215, the decryption module 217, the index module 230, and the storage module 219. Similarly stated, the functions and/or operations described with respect to security module 206 (and associated modules) can be implemented and/or executed by processor 220. In some implementations, based on the methods or processes stored within the memory 210, the processor 220 can be configured to execute index searching processes, as described in FIGS. 3-5.

While shown and described in FIG. 2 as being within a single security device 205, in other embodiments, the components and modules of the security device 205 can be distributed between multiple devices. For example, in such other embodiments, the interface module, randomizer module, encryption module, decryption module, the index module, and/or storage module can be distributed across two or more compute devices operatively coupled via a network. In such other embodiments, the one or more compute devices can work together to implement the functions of the security module.

Figure 3:
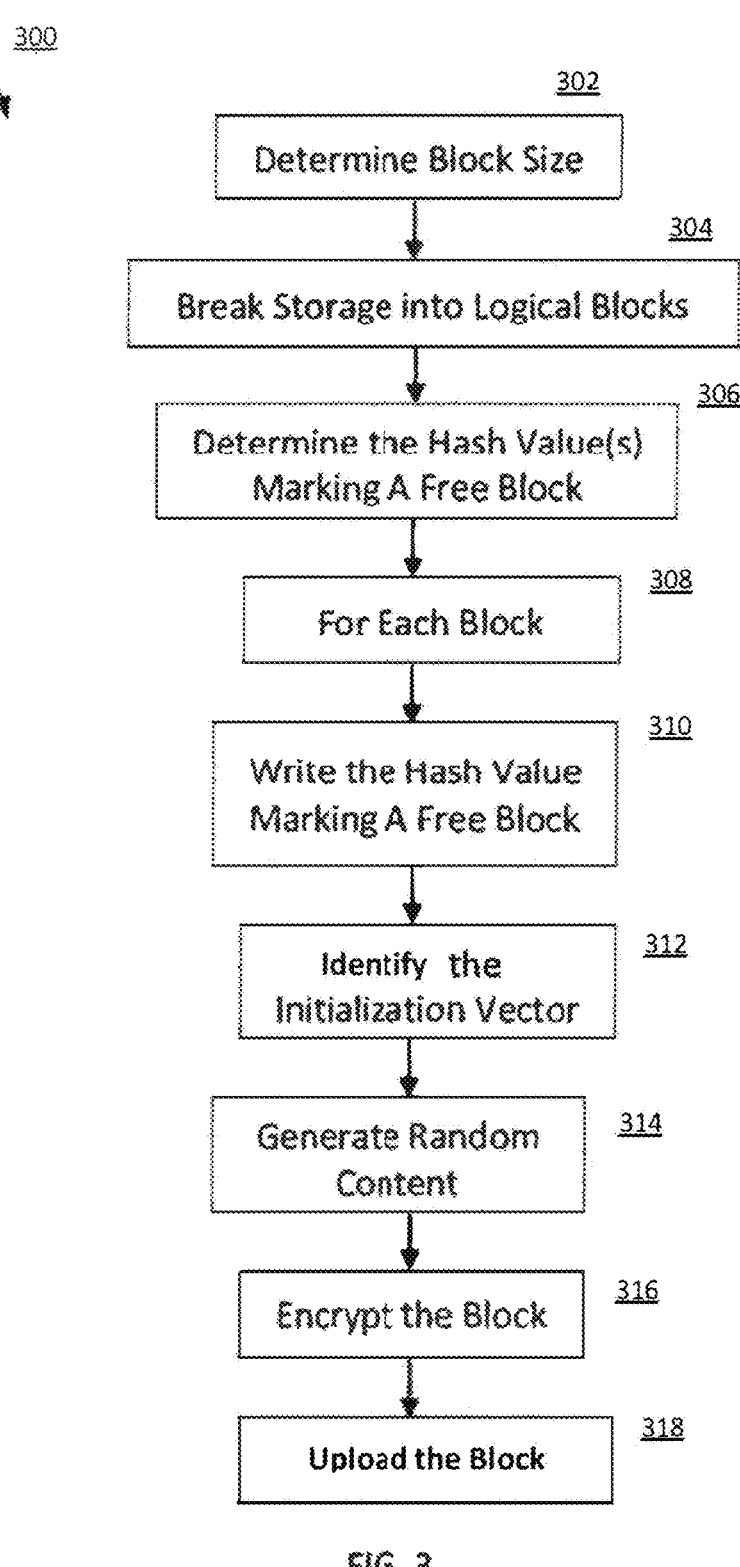
FIG. 3 is a flowchart illustrating an initialization process, according to an embodiment.

FIG. 3 is a flowchart illustrating an initialization process 300, according to an embodiment. This initialization process 300 can be implemented at a processor and/or a memory (e.g., processor 220 or memory 210 as discussed with respect to FIG. 2) of a security device (such as the security device 105 in FIG. 1 and the security device 205 in FIG. 2). In some instances, the initialization process 300 can be used to prepare a backend storage (such as the backend storage 107 in FIG. 1) for implementing zero-trust storage (such as the zero-trust storage 101 in FIG. 1). In some instances, the initialization process 300 can be executed before any documents (e.g., index files) are uploaded or as part of a batch upload operation for an initial set of documents (e.g., index files). In other instances, the steps in the initialization process 300 can be performed as each memory block (e.g., storage location) is used for the first time (and not for subsequent use). By performing the steps of the initialization process as a standalone step or during an initial batch upload operation, the initialization process 300 can effectively hide existence of documents (e.g., index files) in the zero-trust storage.

At 302, the processor (such as the processor 220 of the security device 205 in FIG. 2) determines a block size of the backend storage (e.g., a block size supported by the backend storage). At 304, the processor then breaks the backend storage into a set of logical memory blocks based on the block size. To break the backend storage logical storage unit into the logical memory blocks, the security device can use a logical block size. This logical block size can be determined either algorithmically based upon sample documents or as an input specified by the user (or a system administrator). Each logical memory block from the set of logical memory blocks is associated with a different logical memory block identifier (to be used by the processor to reference storage locations within a backend storage). To treat the backend storage uniformly, the security device (e.g., the randomizer module and/or the storage module executed by a processor) can treat the backend storage as a logical storage with a naming scheme based on the logical memory block identifiers. The security device (e.g., the randomizer module and/or the storage module executed by a processor) can, according to the actual backend storage used, map the logical memory block identifiers to each storage unit and/or identifier used by the backend storage. As such, the security device can translate and/or map the logical memory block identifiers as used by the security device to the identification scheme used by the backend storage.

At 306, the security device (e.g., the randomizer and/or storage module executed by a processor) can differentiate logical memory blocks marked as free and logical memory blocks marked as used by documents already in the security device. One way to do so is by using a pre-determined hash or identifier value (e.g., all zeroes, all ones) or a set of hash or identifier values to identify free logical memory blocks. Alternatively, a function can be applied that determines whether a logical memory block or a set of multiple logical memory blocks are free. In either case, for each logical memory block, at 308, the security device can implement (1) a process to determine whether a logical memory block in the backend storage is available (and/or free) or unavailable, and/or (2) a process to mark a logical memory block as available (and/or free) or unavailable, at 310 (e.g., by writing the hash value to the memory to identify a free or available block).

In some instances, at 312, an initialization vector for each logical memory block can be determined and/or identified (e.g., by the encryption module). In some instances, for example, for encryption processes in which the initialization vectors are non-repeating (but not random), a counter can be used for the initialization vector. For example, an initial initialization vector can have a value of all zeroes and can be incremented each time a new value is used. For another example, an initial initialization vector can use all ones and can be decremented each time a new value is used. In some instances, the same initialization vector can be used for each block of memory being initialized. Alternatively, an initialization vector can be randomly generated for each block of memory.

In some instances, an initial content of each logical memory block can be pre-determined or generated randomly, at 314. Such a pre-determined value can be a value (such as all zeroes or all ones) or the content of documents being batch uploaded as part of initialization. Regardless of block content, because encryption randomizes the output, after encryption, the encrypted logical memory blocks can appear cryptographically non-distinguishable.

In some instances, at 316, the processor encrypts each logical memory block (i.e., the data within that logical memory block) using the initialization vector and the encryption key used for the zero-trust storage. The processor then uploads and writes the logical memory blocks to the backend storage, at 318. Because each logical memory block is encrypted and then uploaded to the backend storage and because the encryption key is not uploaded to the backend storage, the backend storage is unable to determine whether any documents (e.g., index files) are actually being uploaded along with the initialization step.

FIG. 4 is a flowchart illustrating an index searching process 400, according to an embodiment. This index searching process 400 can be implemented at a processor and/or a memory (e.g., processor 220 or memory 210 as discussed in FIG. 2) of a security device (such as the security device 105 in FIG. 1 and the security device 205 in FIG. 2). A search request including a search string (e.g., a phrase, a word, a letter, a number, a symbol, and/or the like) is received from a compute device, at 401. The search string is associated with a characteristic (e.g., a phrase, a word, a letter, or meta-data) in a set of documents within a database (e.g., stored in a backend storage). In some implementations, the search string can be converted to a hash value (e.g., using any suitable hash function). This hash value can be used as an input to a seed mapping function to generate a seed. In other instances, the hash value can be used as a seed. In still other instances, the search string can be used as a seed. In still other instances, any other suitable identifier can be used instead of a hash.

The search string (and/or any other suitable parameters such as a range, a seed a cryptographic key and/or the like) can be used as an input (e.g., at a pseudorandom number generator) to generate a sequence of numbers (e.g., using any suitable sequence generating function or "pseudorandom number generator") (also referred to herein as a set of logical block identifiers), at 402. This sequence of numbers can then be used (e.g., by the storage module) to retrieve data (e.g., index data) from a set of memory blocks (e.g., retrieve data at a set of storage locations) from the backend storage, at 403. As discussed above, using a pseudorandom number generator to produce the sequence of numbers that correspond to the set of memory blocks randomizes where in the backend storage each block of data is stored. Similarly stated, the sequence of numbers can correspond to and/or be associated with memory locations in the backend storage.

The set of data blocks (i.e., index data) can then be sent (e.g., by the randomizer module) to the decryption module, which can decrypt the data blocks (i.e., index data) and return decrypted data blocks (to the randomizer module, for example). In other instances, the data in the backend storage is not encrypted, and thus, the data blocks (i.e., index data) are not decrypted (e.g., by the decryption module).

In some instances, it can be determined (e.g., by the randomizer module 213 in FIG. 2) if the retrieved index data stored at each storage location include a hash value produced by the document meta-data and/or an identifier associated with the document. Specifically, it can be determined whether the retrieved index data are part of the requested document by matching one or more identifier(s) stored with the index data (or a hash value produced based on the identifier(s)) and the hash value (or other identifiers). If none of the retrieved index data match the hash value, the document is determined to not be stored in the backend storage. If at least one block of index data matches the hash value, any additional blocks of index data can be retrieved (e.g., by the storage module 219 in FIG. 2) using remaining numbers from the sequence of numbers. After the blocks of index data associated with the search request have been retrieved and decrypted, they can be pieced together and/or compiled (e.g., using the sequence of numbers to identify order) to produce a search result file, at 404. In some instances, the compiled document (i.e., the search result file) can then be returned to the client device 103.

The search result file (which can be a portion of the uploaded index file) can associate a characteristic (e.g., a word, a letter, a phrase, or meta-data) in a set of documents with a set of information associated with the characteristic in the set of documents. The set of information can include, for example, a document identifier (1) from a set of document identifiers and (2) for each document from the set of documents, a set of locations of the characteristic in the set of documents, a set of statistical information associated with the characteristic in the set of documents, a relationship information associated with a relationship between a first characteristic in the set of documents and a second characteristic in the set of documents, and/or the like. For example, the search result file can include associations of phrase "San Francisco" with (1) the document identifier of each document that has the phrase "San Francisco", (2) the location in the storage (e.g., backend storage 107) of each document that has the phrase, (3) the location of the phrase in each document (e.g., page 2, paragraph 3, line 4), (4) how many times the phrase appears in each document, (5) all the other words that are in the same sentence of the phrase in each document, (6) the document identifier of each document that has the phrase "San Francisco" and the phrase "software engineer," and/or the like. In some instances, each document identifier from the set of document identifiers can be associated with a document from the set of documents associated with the characteristic. In some instances, the set of information is identified based on the search result file and sent as a first signal to the compute device, at 405.

In some implementations, the index data can be stored at different storage systems, different storage locations within the same storage system (e.g., the backend storage 107), or different databases within the same storage system. When the index data are stored at different databases within the same storage system, the set of logical block identifiers is associated with the set of storage locations of the different databases.

In some instances, to hide data that may provide enough information of the document (or the index file, or the client device) to compromise the document and/or the system, the index searching process 400 can be executed regardless of operations (i.e., whether the actual operation is search, read, write, append, delete, or update). For example, even if the user knows that a new document (e.g., index file) is being written and there is thus no need to check whether this document (e.g., index file) already exists in the system, for the overall security of the system and to hide from the backend storage that a new document (e.g., index file) is being written, the index searching process can be run to fetch the data blocks corresponding to the sequence generated from the seed based on the document identifier. In some instances, the index searching process can (1) obscure the access pattern of the backend storage by downloading a set of data blocks with each operation, and (2) download an initial set of data blocks to either identify whether a document (e.g., index file) exists in the backend storage already (to read/return the content, delete the content, or append/update the content), or to find suitable free logical memory blocks for new document (write) or new content of the existing document (append/update the content).

In some instances, an initialization vector for the index data stored at each storage location from the set of storage locations is modified to define modified index data for each storage location from the set of storage locations, at 406. The modified index data for each storage location from the set of storage locations is encrypted prior to sending a second signal to the database. Finally, a second signal can be sent to the database to write the modified index data for each storage location from the set of storage locations to that storage location from the set of storage locations within the database, at 407.

FIG. 5 is a flowchart illustrating an index file upload process 500 in the case of a read operation, according to an embodiment. The index file upload process 500 can be implemented at a processor and/or a memory (e.g., processor 220 or memory 210 as discussed in FIG. 2) of a security device (such as the security device 105 in FIG. 1 and the security device 205 in FIG. 2). In some instances, the index file upload process 500 can be performed after an index file is received at 501 (e.g., from a third party server, or from a client device). The index file associates a characteristic in a set of documents with a set of information associated with the characteristic in the set of documents. In some implementations, a set of documents can be received (e.g., from the index server or from the client device) and parsed to generate a set of index files based on the set of documents (e.g., by an index module). An index identifier can be generated for each index file from the set of index files, at 502.

In some instances, the index file upload process 500 is performed after search results are identified in response to a search request. For example, the method 400 of executing the index searching process includes, at 406, modifying an initialization vector for the index data stored at each storage location from the set of storage locations to define modified index data for each storage location from the set of storage locations. Subsequently, the method 400 of executing the index searching process includes, at 407, sending a second signal to the database to write the modified index data for each storage location. Steps 406 and 407 can be executed based on the index file upload process 500 described herein. In some instances, regardless of whether the index file already exists in the backend storage, a set of data blocks from the index searching operation can be received (e.g., by the randomizer module). The set of data blocks can correspond to the sequence generated from the pseudorandom number generator based on a seed generated from a seed mapping function (e.g., hashing or other mapping) using the document identifier (or the search string) as an input to the seed mapping function.

For example, depending on whether the randomizer module stores the index identifier, the hash, the seed, and/or the sequence in memory, the randomizer module may or may not recalculate the hash, regenerate the seed, and/or regenerate the sequence, but these inputs can be used by the index file upload process 500 as well as the index searching process. In some implementations, when the randomizer module does not have the seed, the generated sequence, the hash, and/or the set of data blocks, a hash value (e.g., identifier) and/or a seed can be regenerated/recalculated, and a set of pseudorandom logical block identifiers (or a sequence) can also be regenerated, at 503. Such newly generated set of pseudorandom logical block identifiers, hash value (e.g., a document identifier), seed, and/or the sequence can be stored and used in other steps of an index searching process (as described with respect to FIG. 4). Such newly generated set of pseudorandom logical block identifiers, hash value (e.g., a document identifier), seed, and/or the sequence can be stored temporarily (e.g., in a buffer) only for this operation and removed from memory (e.g., the buffer) after this operation finishes, stored temporarily (e.g., in a buffer) for a set of operations but removed from memory (e.g., the buffer) after a period of time, or stored permanently in long-term memory (such as memory 210 in FIG. 2). The set of pseudorandom logical block identifiers is associated with a set of storage locations of a database (for example, in the backend storage 107.) In other implementations, the randomizer module can already have the seed, the sequence, the hash, and the set of data blocks downloaded based on the index searching process.

At 504, the index file can be parsed into a set of index data portions and each index data portion from the set of index data portions can be stored (or written or uploaded) at a different storage location in the backend storage as indicated by a different identifier from the set of pseudorandom logical block identifiers. Prior to storing each index data portion at each storage location, data stored at each storage location from the set of storage locations can be retrieved, at 505, using the set of logical block identifiers for the purpose of obfuscating the index file upload operation from potential attackers. Subsequently, each index data portion can be stored by sending a signal to the backend storage or to a database in the backend storage, at 506. In some implementations, the set of index data portions can be stored at different storage systems, different storage locations within the same storage system (e.g., the backend storage), or different databases within the same storage system.

To obfuscate the index file upload operation from potential attackers that are able to observe a communication network, a zero-trust storage (e.g., the zero-trust storage 101 in FIG. 1) and/or storage operations of the backend storage, the index file upload process can be followed or proceeded by a download process (or an index searching process). In other words, to obfuscate the index file upload (or download) operation from potential attackers, both the index file upload process and the index file download process are performed in each operation. The index file upload process can be proceeded or followed by the index file download process in such operations. In other instances, this obfuscation can be eliminated if network efficiency is more important than the security from the obfuscation. The purpose of the obfuscation is to prevent attackers from differentiating the upload operation from the other operations (delete/write/ update/append).

For each data block (i.e., index data portion) associated with the set of pseudorandom logical block identifiers, the index file upload process can re-encrypt each data block (i.e., index data portion) and then upload the data blocks (i.e., index data portion) back to the backend storage. Thus, from the perspective of backend storage, for either a read or write operation, the data blocks (i.e., index data portion) stored within a set of logical memory blocks are downloaded, and then each data block is uploaded back into the system regardless of whether the data block value changed. The same set of operations (download and then upload to rewrite each logical memory block) is also used in other operations (delete/write/update/append).

In some instances, the re-encryption process can include: (1) decrypt the block of data, (2) update the initialization vector for that block of data (i.e., index data portion), and (3) encrypt the data block (i.e., index data portion) with the new updated initialization vector. For the decryption step, in some instances, some of the data blocks may have already been decrypted from the index searching process. To re-encrypt the data block, if nothing has changed (e.g., the content has not changed), the initialization vector can be changed so a different encrypted data block with the same content is produced. An example process is to use an encryption process with a counter as an initialization vector (e.g., increase the initialization vector every time the data block is re-encrypted). In some instances, the initialization vector can be combined with the underlying data such that the encrypted data includes both the underlying data and the initialization vector. In other instances, the initialization vector can be used to determine an encryption key used to encrypt the block of data. In such an instance, the initialization vectors for specific files can be stored (e.g., at the security device 205) such that the appropriate initialization vector can be used to decrypt data when retrieved. In either instance, the data uploaded to the backend storage can appear different to the backend storage.

In some instances, to hide which logical memory blocks or whether any logical memory blocks were used, the index file upload process can gather the data blocks that were downloaded and re-encrypted, and then upload all of them (regardless of what data blocks have changed). In other instances, only a portion of the data blocks downloaded are uploaded, such as those that have changed in value. In still other instances, a random subset of the data blocks that did not change is uploaded with the modified data blocks.

The index file can be updated periodically, automatically, or manually by commands (by a system user). For example, the steps of parsing 504, retrieving 505, and sending a signal to write 506 in the index file upload process 500 can be performed periodically, repeatedly, automatically (e.g., every time the index file is updated, the index file can be uploaded according to the index file upload process), or manually by commands (by a system user).

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example, instead of using the pseudorandom number generator, in some instances, a mapping table that maps the client document identifier to the backend document identifier for the documents stored in the zero-trust storage can be used. Such a mapping table, however, does not scale as well as the system described above and the mapping table itself stores more information regarding the file stored in the zero-trust storage than the system described above. Such a mapping table could potentially leak the actual document identifiers used to retrieve the documents stored in the zero-trust storage. The mapping table can also become large both in memory and on disk. As such, the embodiment using pseudo-random number generator is potentially more secure and more memory efficient as there is no single catalog of the documents stored in the zero-trust storage.

While some steps in the processes and/or methods described with respect to the flow charts in FIGS. 3-5 refer are described to be performed by a specific module (e.g., the randomizer module 213 of the security device 205 or the zero-trust storage 101), in other embodiments, such steps can be performed by any other suitable module(s), processor(s), device(s) and/or the like.

The above-disclosed systems and methods allow for fast and secure searching of encrypted documents. Specifically, by storing an index of encrypted documents in a storage system as described herein (e.g., using security device 105 of FIG. 1), security around such an index can be increased. For example, using a security module (e.g., security module 206 of FIG. 2), such indexes can be randomly stored in a backend storage. This also allows users to search encrypted documents using search strings, rather than file identifiers increasing the security of the link between the data indexed in such files and the file identifiers. This can allow users to easily and securely search encrypted documents stored with the index and/or in another storage location.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:

a memory; and a processor operatively coupled to the memory, the memory storing instructions configured to cause the processor to:

receive, at a security device, an index file from a plurality of index files;

parse each index file from the plurality of index files into a plurality of index data portions, each index data portion from the plurality of index data portions including a different index entry from remaining index data portions from the plurality of index data portions;

calculate a hash value for each index data portion from the plurality of index data portions, the hash value for each index data portion from the plurality of index data portions being an identifier that identifies a different storage location from a set of storage locations within a storage system having a plurality of databases; and send a signal to store each index data portion from the plurality of index data portions at a different storage location from the set of storage locations within the storage system to cause (i) a first index data portion from the plurality of index data portions to be stored within a first database from the plurality of databases and (ii) a second index data portion from the plurality of index data portions to be stored within a second database from the plurality of databases.

2. The apparatus of claim 1, wherein the index file is associated with (1) a characteristic in a set of documents and (2) information associated with the characteristic in the set of documents, the information includes a hash value used to identify each document from the set of documents within the storage system.

3. The apparatus of claim 1, wherein the instructions are further configured to cause the processor to:

parse each index data portion from the plurality of index data portions into a set of secondary index data portions; and send a signal to the storage system to store each secondary index data portion from the set of secondary index data portions at a different storage location from the set of storage locations within the storage system.

4. The apparatus of claim 1, wherein the instructions are further configured to cause the processor to:

send a signal to a third database to store each index data portion from the plurality of index data portions at a storage location from a set of storage locations within the third database.

5. The apparatus of claim 1, wherein the instructions are further configured to cause the processor to:

modify an initialization vector for each index data portion from the plurality of index data portions, the instructions configured to cause the processor to send including instructions configured to cause the processor to send the signal to store each index data portion from the plurality of index data portions as modified by the initialization vector for that index data portion at a different storage location from the set of storage locations within the storage system.

6. The apparatus of claim 1, wherein a hash value is used with a cryptographic key to identify a storage location from the set of storage locations within the storage system.

7. The apparatus of claim 1, wherein each index file from the plurality of index files is an encrypted index file.

8. The apparatus of claim 1, wherein the hash value for each index data portion from the plurality of index data portions is not stored in long-term memory.

9. The apparatus of claim 1, wherein the hash value for each index data portion from the plurality of index data portions is calculated using a hash function.

10. A non-transitory processor-readable medium storing instructions to cause one or more processors to:

receive, at a security device, an index file from a plurality of index files;

parse each index file from the plurality of index files into a plurality of index data portions, each index data portion from the plurality of index data portions including a different index entry from remaining index data portions from the plurality of index data portions;

calculate a hash value for each index data portion from the plurality of index data portions, the hash value for each index data portion used to identify a different storage location from a set of storage locations within a storage system having a plurality of databases; and send a signal to store each index data portion from the plurality of index data portions at a different storage location from the set of storage locations within the storage system to cause (i) a first index data portion from the plurality of index data portions to be stored within a first database from the plurality of databases and (ii) a second index data portion from the plurality of index data portions to be stored within a second database from the plurality of databases.

11. The non-transitory processor-readable medium of claim 10, wherein the index file is associated with (1) a characteristic in a set of documents and (2) information associated with the characteristic in the set of documents, the information includes the hash value for each index data portion used to identify each document from the set of documents within the storage system.

12. The non-transitory processor-readable medium of claim 10, the instructions further comprising instructions to cause the one or more processors to:

parse each index data portion from the plurality of index data portions into a set of secondary index data portions; and send a signal to the storage system to store each secondary index data portion from the set of secondary index data portions at a different storage location from the set of storage locations within the storage system.

13. The non-transitory processor-readable medium of claim 10, the instructions further comprising instructions to cause the one or more processors to:

send a signal to a third database to store each index data portion from the plurality of index data portions at a storage location from a set of storage locations within the third database.

14. The non-transitory processor-readable medium of claim 10, the instructions further comprising instructions to cause the one or more processors to:

modify an initialization vector for each index data portion from the plurality of index data portions, the instructions configured to cause the one or more processors to send the signal including instructions configured to cause the one or more processors to send the signal to store each index data portion from the plurality of index data portions as modified by the initialization vector for that index data portion at a different storage location from the set of storage locations within the storage system.

15. The non-transitory processor-readable medium of claim 10, wherein the hash value for each index data portion is used with a cryptographic key to identify the different storage location from the set of storage locations within the storage system.

16. The non-transitory processor-readable medium of claim 10, wherein the hash value for each index data portion from the plurality of index data portions is calculated using a hash function.

17. A method, comprising:

receiving, at a security device, an index file from a plurality of index files;

parsing each index file from the plurality of index files into a plurality of index data portions, each index data portion from the plurality of index data portions including a different index entry from remaining index data portions from the plurality of index data portions;

calculating a hash value for each index data portion from the plurality of index data portions, the hash value for each index data portion used to identify a different storage location from a set of storage locations within a storage system having a plurality of databases; and sending a signal to store each index data portion from the plurality of index data portions at a different storage location from the set of storage locations within the storage system to cause (i) a first index data portion from the plurality of index data portions to be stored within a first database from the plurality of databases and (ii) a second index data portion from the plurality of index data portions to be stored within a second database from the plurality of databases.

18. The method of claim 17, wherein the index file is associated with (1) a characteristic in a set of documents and (2) information associated with the characteristic in the set of documents, the information includes the hash value for each index data portion used to identify each document from the set of documents within the storage system.

19. The method of claim 17, further comprising:

parsing each index data portion from the plurality of index data portions into a set of secondary index data portions; and sending a signal to the storage system to store each secondary index data portion from the set of secondary index data portions at a different storage location from the set of storage locations within the storage system.

20. The method of claim 17, further comprising:

modifying an initialization vector for each index data portion from the plurality of index data portions, the sending includes sending the signal to store each index data portion from the plurality of index data portions as modified by the initialization vector for that index data portion at a different storage location from the set of storage locations within the storage system.

\* \* \* \* \*